March 16, 1948.  J. T. HUGHES  2,437,960
FENDER STRUCTURE
Filed Sept. 13, 1945

Inventor:
John T. Hughes,
By Dawson, Brothers, Spangenberg,
Attorneys.

Patented Mar. 16, 1948

2,437,960

UNITED STATES PATENT OFFICE 2,437,960

FENDER STRUCTURE

John T. Hughes, Chicago, Ill.

Application September 13, 1945, Serial No. 615,931

3 Claims. (Cl. 280—152)

This invention relates to fender structure, and more particularly to a resilient form of fender and supporting means therefor which make it highly useful in connection with automobiles and other types of vehicles employing fenders.

An object of the invention is to provide a fender and supporting means therefor which render it dent-proof, rustless, and yet resistant to impact and protective of the wheel and other structure therebelow. Another object is to provide a fender structure which will enable mud caked thereon to be readily removed by blows which do not affect the contour or surfacing of the fender, which tends to eliminate body squeaks, and which provides an added factor of safety in crashes and motor accidents. Yet another object is to provide a fender structure which preserves its original attractive appearance irrespective of scratches and blows and which is equipped with special means for absorbing the force of an impact while at the same time restoring the fender and its supporting parts to their original position after the force is removed. Other specific objects and advantages will appear as the specification proceeds.

The invention is illustrated, in a preferred embodiment, by the accompanying drawing, in which—

Figure 1:
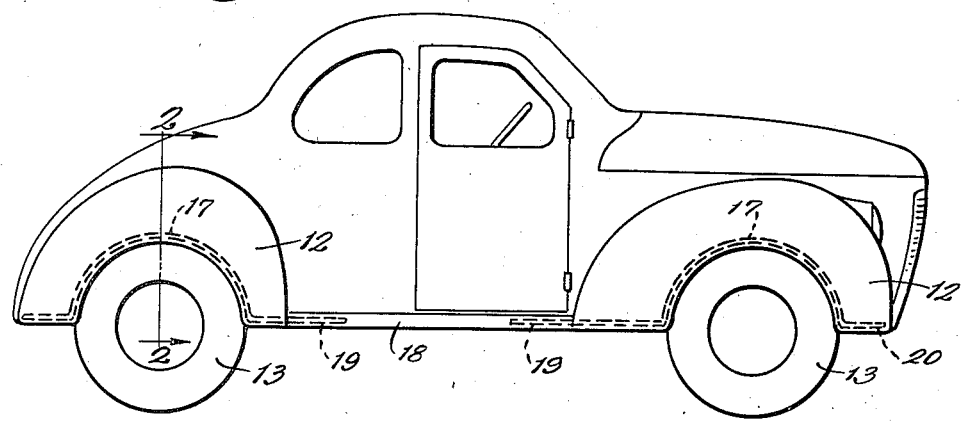
Figure 2:
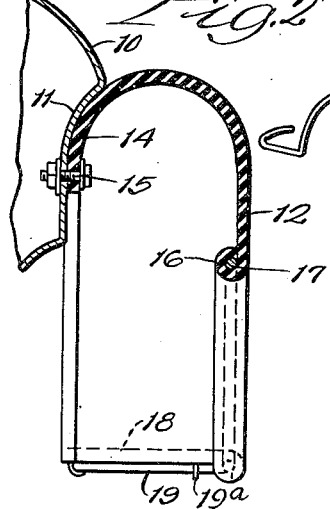
Figure 3:
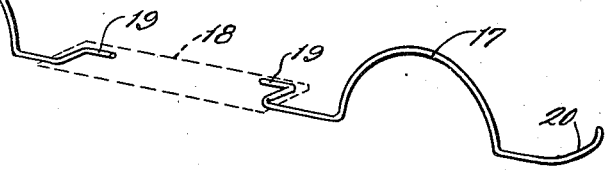

Figure 1 is a side view in elevation of an automobile equipped with a fender structure embodying my invention; Fig. 2, a transverse sectional view, the section being taken as indicated at line 2 of Fig. 1; and Fig. 3, a perspective and developed view showing the resilient metal means for supporting one portion of the fender.

In the illustration given, the automobile is shown provided with a body portion 10 adjacent the wheels. The body portion 10 is concavely formed at 11 to provide an arcuate surface adapted to receive one portion of the fender 12 which extends above the wheels 13.

The fender 12 may be formed of any suitable elastic or resilient non-metallic material. For example, the fender may be formed of rubber or rubber compositions or special synthetic rubber. Preferably, the rubber is reinforced with fabric to increase its sturdiness and shape-maintaining characteristics. For example, a fender body formed of three plies of fabric has been found very satisfactory. It will be understood, however, that the structure of the elastic or resilient fender body may be modified widely while still retaining the important advantages herein described. In the specific illustration given, the heavier inner portion 14 of the fender 12 is secured by bolts 15 to the arcuate portion 11 of the car body. The outer edge portion of the fender, which may, if desired, be thinner in cross section, is provided with a bead or rolled edge 16 adapted to receive a spring steel supporting rod 17. The rod 17 may be molded within the rolled edge 16 so that it, in effect, becomes a part of the fender, or, if desired, in the specific illustration given, the rolled edge 16 merely grips the rod 17 and the rod may be releasably removed therefrom. It will be understood that the rod 17 may be molded into the fender or gripped by the fender at other portions than at the extreme outer edge, if desired.

Any suitable means for supporting the spring supporting bar 17 upon the car body may be employed. In the specific illustration given, where a running board 18 is employed, the inner end of the bar 17, which is provided with a Z-bend 19, is secured by U-bolts 19$^a$ or other suitable means directly to the underside of the running board. This throws the main portion of the rod 17 in line with the outer rolled edge 16 of the fender. The forward end of the rod 17 is turned to form an arcuate support 20 for the front end portion of the fender. It will be noted that the bar or rod 17 is supported only at its inner end in engagement with the running board and that the outer ends are free and may yield under the impact of blows. The curved portion 20, in cooperation with the vertically-curved central portion of the rod 17, provides not only a firm support for the outer edge of the fender, preventing fluttering and vibration, but by reason of such curves enables the fender to yield under impact without damage to the fender while yet providing substantial protection for the wheel structure below the fender. Further, this structure lends itself to a quick spring-back of the fender immediately after the impact and the removal of the collision force.

In the operation of the structure, the fenders are attached to a car as illustrated more clearly in Figs. 1 and 2, with the inner portion 14 secured snugly against the body curve 11, thus providing a leakproof and anti-squeak connection, while the outer portion of the fender is supported by the spring rod 17. Should mud and the like cake upon the fender, and particularly on the underside of the fender, the fender may be struck with a hammer, etc. and the mud easily dislodged without bending the fender or impairing its appearance. The fender itself may be molded in colors to harmonize with the color of the car, and the coloring material, being evenly distributed throughout the body of the rubber, will remain always the same, irrespective of wear or blows upon the fender surface.

Should the fender collide with some other object, the force of the impact will be taken up promptly by the spring steel rod 17, and the sturdiness of the rod will protect the wheels and other important parts from injury thereto. At the same time, the yielding character of the rod serves as a protection to the fender itself and prevents it from being torn or cut. Immediately after the impact, the spring rod 17 swings back to its original position carrying with it the fender body 12 which also, by reason of its resilience, seeks to assume its initial molded position. Since heavy shocks to a car frame are taken up by the bumpers on the car and fenders are designed only for minor protection and for protection against mud, etc., it will be seen that the spring rod structure 17 provides as much strength as is afforded by the ordinary thin metal fender, while at the same time it protects the fender itself from injury and, immediately after impact, restores the fender to its initial position.

Further, the yielding character of the fender and its resilient character tends to protect the body itself from denting and injury which would otherwise result if a hard metal fender were crumbled against the body of the car.

By providing a non-metallic elastic fender in combination with a metallic spring support of the character described, an inexpensive, rust- and dent-proof structure is provided which will be of small cost and which will retain its attractive appearance throughout use while at the same time providing easy means for the removal of mud and other material which clings to the ordinary metal fender.

While in the foregoing specification I have set forth certain specific details of structure as illustrating one mode of the invention, it will be understood that such details may be varied widely by those skilled in the art without departing from the spirit of my invention.

I claim:

1. In combination with a rigid automobile body, a resilient non-metallic web in the shape of a fender, having the inner side thereof lying against and secured to the automobile body and the outer portion of the fender provided at its lower edge with a rolled edge portion, and a spring rod having its inner end anchored to said body and having another portion extending laterally and then forwardly in a position parallel and spaced from said body, said rod being received within the rolled edge portion of said fender and being yieldable longitudinally with respect to said body.

2. In combination with a rigid automobile body, a resilient non-metallic web in the shape of a fender, having its inner longitudinal side portion lying against and secured to said body and having its outer depending portion provided at its bottom with a rolled edge, and a single spring rod having a laterally-extending portion anchored to said body and having a forwardly-extending portion spaced from and parallel with said body and received within the rolled edge of said fender, said spring rod being yieldable longitudinally with respect to said body and having its forward free end turned inwardly in line with the bottom edge portion of the fender web.

3. In combination with a rigid automobile body equipped with a running board, a pair of spring rods having laterally-extending portions secured to the bottom of said running board and having longitudinally-yieldable portions unsupported except by said board extending upwardly and longitudinally thereof, and a pair of resilient non-metallic webs in the shape of fenders, each having its inner side lying against and secured to said automobile body and having its outer edge spaced from said body, said outer edge of each fender being equipped with a rolled edge portion receiving the rod adjacent thereto, each of said rods having free end portions turned inwardly to support end portions of said fenders.

JOHN T. HUGHES.

REFERENCES CITED

The following references are of record in the file of this patent:

UNITED STATES PATENTS

| Number | Name | Date |
|---|---|---|
| 1,749,453 | Thomas | Mar. 4, 1930 |
| 1,827,435 | Nastri | Oct. 13, 1931 |
| 2,309,898 | Hansen | Feb. 2, 1943 |

FOREIGN PATENTS

| Number | Country | Date |
|---|---|---|
| 7,956 | Great Britain | Apr. 6, 1904 |
| 222,921 | Great Britain | Oct. 16, 1924 |
| 651,484 | France | Oct. 9, 1928 |